LOGIC CIRCUITRY

Filed April 26, 1967

INVENTOR
ROBERT O. WINDER
BY John V. Regan
ATTORNEY

INVENTOR
ROBERT O. WINDER
BY John V. Regan
ATTORNEY

United States Patent Office 3,508,076

Patented Apr. 21, 1970

3,508,076

LOGIC CIRCUITRY

Robert O. Winder, Trenton, N.J., assignor to RCA Corporation, a corporation of Delaware Filed Apr. 26, 1967, Ser. No. 633,825
Int. Cl. H03k 5/20, 19/34
U.S. Cl. 307—235 6 Claims

ABSTRACT OF THE DISCLOSURE

A digital circuit family which includes compatible threshold and other logic circuit realizations is described. The circuit family which is readily implemented with current mode switches, emitter-follower transistors and single-valued resistors has near perfect tracking with $V_{BE}$ (base-emitter junction voltage drop) and power supply voltages; is nonsaturating; includes majority, AND phantom OR circuit realizations; and is especially suited for large scale integrated circuit arrays.

CROSS REFERENCE

An application, Ser. No. 510,307, now U.S. Patent 3,383,612, entitled, Electronic Circuit, filed on Nov. 29, 1965 by Leopold A. Harwood and assigned to the present assignee describes a power supply or control voltage circuit which may be conveniently employed with the logic circuitry of the present invention.

BACKGROUND OF THE INVENTION

Digital systems, such as electronic computers and other apparatus, generally contain various subsystem functional units, such as counters, registers, adders and other switching networks. These subsystem units are generally designed with the use of more elemental functional units known as logic gates. Some types of logic gates are relatively inflexible in switching function insofar as they produce only a single function, as for example the NOR function. On the other hand, threshold gates are relatively flexible in that they are capable of producing a variety of switching functions including, inter alia, the AND, OR, *m*-out-of-*n* switching functions as well as majority, minority and other switching functions.

The present invention relates to electronic switching and logic apparatus. In particular, the invention relates to logic circuitry which in one form may provide threshold switching functions; and which in other forms provides such switching functions as AND, inversion, and the like; while permitting "phantom" or wired-OR connections.

As used herein, threshold logic circuitry refers to circuitry having a threshold T, a number $n$ of binary inputs the $i^{th}$ input ofwhich may have a weight $w_i$ and a binary output, where T, $n$ and each $w_i$ are integers. The threshold circuit function is a summation-discrimination process wherein the weighted binary inputs are summed and the sum is compared with the threshold T. The binary significance of the output depends upon whether or not the sum of the inputs exceeds the threshold T. The majority and minority gates are special cases of the threshold gate wherein $n$ is odd, the weight $w_i$ is unity for each input and the threshold T is $$\frac{n+1}{2}$$

The majority gate output is 0 or 1 accordingly, as there are more 0's or 1's on the input lines; while the minority gate output is 0 or 1 accordingly, as there are fewer 0's or 1's on the inputs.

BRIEF SUMMARY OF INVENTION

According to the illustrated examples of the invention, the logic circuitry employs logic signals of such nature that any signal voltage more positive than a fixed predetermined reference voltage $V_{ref}$ is of a first binary significance; while any voltage level more negative than $V_{ref}$ is of the second binary significance. The logic circuitry has $n$ comparators, where $n$ is an integer, and an output line for each comparator whereby the comparators compare their applied input signal voltages with $V_{ref}$ to provide signals on their associated output lines. Output signal deriving means provides an output signal voltage, the binary significance of which is dependent upon its value relative to $V_{ref}$.

In the threshold logic circuit example, the output signal deriving means includes a load impedance means for the comparators and a common output line connection to provide an effective summation of the applied input signals; while the discrimination (comparison with threshold) function is performed at the input comparator of the next or driven threshold logic or ther circuit. In one example of the invention useful in integrated circuit structures, the load impedance means may be implemented by a load resistor for each comparator. For the AND gate example, the output deriving means includes a load resistance which generally has a higher value as compared to the threshold gate. The inversion circuit example, is a special case of $n=1$ and for which the output deriving means includes an inverting type amplifying element.

DESCRIPTION OF THE PREFERRED EMBODIMENTS

Figure 1:
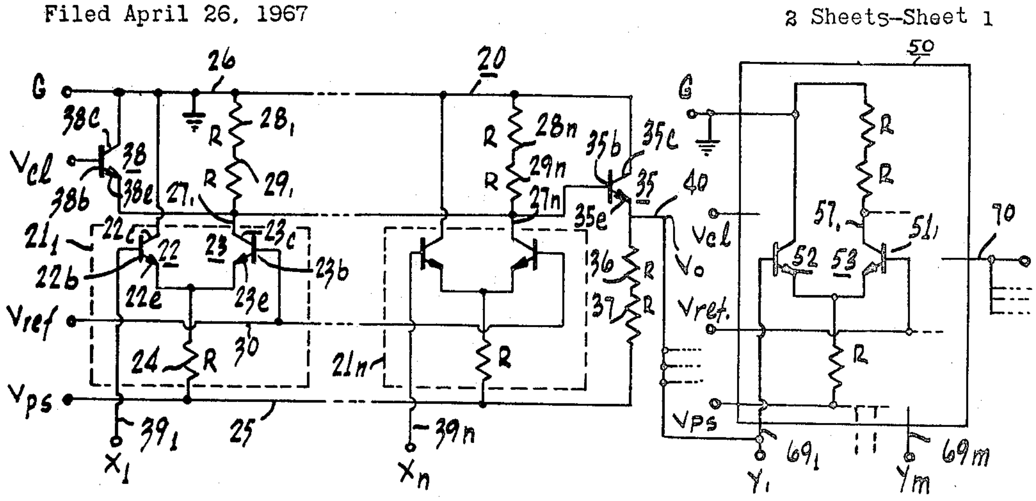
FIG. 1 is a circuit diagram of a threshold logic circuit example in accordance with the invention.

The logic circuitry of this invenion is not limited in application to the use of any particular type of switching device, such as bipolar transistors, diodes, field-effect transistors, and the like, or to any particular circuit configuration for the binary signal comparators. However, for the purpose of example and for completeness of description, the logic circuitry illustrated on the drawing includes one type of switching device, the bipolar transistor, and one type of comparator circuit, an emitter-coupled current mode switch, which may be utilized to implement the invention. Moreover, the use of NPN transistors is also by way of example. Transistors of the PNP-type may also be employed.

The logic circuits according to the present invention may be constructed either with discrete components or by means of integrated circuit processes. As used herein, the term, "integrated circuit," refers to those technologies by which an entire circuit can be formed as by diffusion or by films in or on one or more chips of material such as silicon, sapphire, glass, and the like. As integrated circuit technology has progressed, component densities have increased whereby the amount of circuit function which can be fabricated in or on the same substrate has increased to relatively sophisticated functions (multi-function chips) at the system or subsystem level. One approach to multi-function chips is to arrange the circuit components into an array of cells with appropriate cell intraconnections and interconnections to provide the desired circuit function on the chip. The illustrated transistor logic circuit examples of the present invention are especially suited for the circuit design of these multi-function chips.

Referring now to FIG. 1, two stages of logic circuitry are illustrated for the threshold logic function with the left-hand stage 20 driving the right-hand stage 50. The stage 20 has a number *n* of identical comparator circuits 21 of which only the comparators $21_1$ and $21_n$ are illustrated in order to avoid repetition. The number *n* is an integer and is assumed to be odd at the outset in order to illustrate a preferred majority gate embodiment. Each of the comparators $21_1$ and $21_n$ is connected to a power supply line 25. Each comparator is also connected to an associated input line $39_1$ or $39_n$, as the case may be, and to a reference voltage line 30. The input lines $39_1$ and $39_n$ are connected to receive input signals $X_1$ and $X_n$, respectively, each having effective unity weight; while the reference voltage line 30 is connected to receive a fixed reference voltage $V_{ref}$ as designated at the left of stage 20. Each of the comparators $21_1$ and $21_n$ has at least one output line $27_1$ and $27_n$, respectively.

An output signal deriving means connects the output lines together, and by way of load impedance means illustrated as separate load resistors to another power supply line 26. Thus, load resistors $28_1$ and $29_1$ connect output line $27_1$ to power supply line 26; while load resistances $28_n$ and $29_n$ connect output line $27_n$ to the supply line 26. It should be noted that the load impedance means could be a single load resistance of appropriate value.

The output signal deriving means further includes an emitter-follower transistor 35 having its base electrode **35*b* connected to the output lines $27_1$ and $27_n$. The collector electrode 35*c* is connected to the supply line 26; while the emitter electrode 35*e* is connected by way of emitter resistors 36 and 37 to the supply line 25. The emitter electrode 35*e* is further connected to a first stage output line 40**.

The supply lines 25 and 26 are connected across the terminals of a source of operating voltage having a value $V_{PS}$ which may be any suitable D.C. source, such as a battery. The line 25 is designated as the $V_{PS}$ line; while the line 26 is arbitrarily designated as the ground line G, as illustrated by the conventional symbol in FIG. 1.

Each of the comparators $21_1$ and $21_n$ contain similar components and intraconnections so that only the comparator $21_1$ will be described in detail. The comparator $21_1$ is illustrated as a current mode switch having a pair of transistors 22 and 23. The emitter electrodes **22*e* and 23*e* are connected in common and by way of common emitter resistor 24 to the supply line 25. The base electrode 22*b* is connected to the input line $X_1$; while the base electrode 23*b* is connected to the $V_{ref}$ line 30. The collector electrode 22*c* is connected directly to the ground line 26; while the collector electrode 23*c*** is connected to the output line $27_1$.

The output line 40, which may have a large fan-out, as illustrated by the dashed connections, is connected to an input line $69_1$ of the driven stage 50. The driven stage 50 is similar to the stage 20 in all respects except that it may have a different number *m* of input lines, as illustrated by the input $69_m$. Again only two input lines are illustrated to avoid repetition. The input lines $69_1$ and $69_m$ are connected to receive the input signal voltages which are designated $Y_1$ and $Y_m$, respectively. The stage 50 is further adapted for connection to the same $V_{PS}$, and $V_{ref}$ terminals as the stage 20. The circuit of the input comparator 51 associated with the input line $Y_1$ is illustrated as being substantially similar to the comparators $21_1$ and $21_n$ with the current switching transistors being identified by reference characters 52 and 53. The stage 50 also has an output line 70.

In the operation of the illustrated NPN-transistor circuitry example of the invention, $V_{PS}$ has a value more negative than the ground reference G, and $V_{ref}$ has a value in between $V_{PS}$ and G whereby $V_{ref}$ can be obtained by means of a voltage divider. Each of the input comparators compares its applied signal voltage to the reference voltage $V_{ref}$ and either does or does not provide an output current on its associated output line depending upon whether the input signal voltage is less or greater than $V_{ref}$.

Referring in particular to the comparator $21_1$, the voltage $V_{PS}$ and the common emitter resistor 24 simulate a source of current for the current switching transistors 22 and 23. Whenever the applied signal voltage $X_1$ has a value which is greater than $V_{ref}$, the transistor 22 is turned on and the transistor 23 is turned off. The current source current is routed through the collector-to-emitter path of transistor 22 and substantially no current flows on the output line $27_1$. On the other hand, when the applied signal voltage $X_1$ is less than $V_{ref}$, the transistor 23 is turned on and the transistor 22 is turned off. For this input signal condition, the current source current is routed through the collector-to-emitter path of the transistor 23 such that output current flows in the output line $27_1$ to develop an output voltage across the load resistors $28_1$ and $29_1$. Each of the other comparators in the stages 20 and 50 respond to their applied input signals in a similar manner either to provide or not to provide an output current flow. The output current contributions of the stage 20 comparators are effectively summed by the parallel load resistance combination and applied by way of emitter-follower transistor 35 as an input signal $Y_1$ to the driven stage 50. The input comparator 51 in the driven stage 50 provides the function of discrimination or comparison with threshold for the signal voltages $X_1$ through $X_n$.

The present invention differs from the prior art use of current mode switch comparators in binary systems in that the logic signal voltages are permitted to assume any value above (more positive than) or below (more negative than) $V_{ref}$; whereas in the prior art usage of current mode switch comparators the logic signal levels were confined to either a high (HI) voltage level or a low (LO) voltage level relative to $V_{ref}$ with the HI and LO levels being assigned a desired binary significance. In the present invention, the signal voltage can be any value determined by the summed current contributions of the input comparators such that the voltage values above and below $V_{ref}$ are assigned a first and second binary significance. As can be seen in the graphic display of FIG. 2 and for the purpose of the description which follows, the binary digits 1 and 0 are arbitrarily assigned to signal voltage values above and below $V_{ref}$, respectively.

By employing the foregoing signal concept the present invention eliminates the need in a threshold gate for a separate discriminator circuit in that the function of discrimination is performed by the input comparator of the driven stage. Moreover, this signal concept permits a circuit design wherein temperature and power supply tracking are reliable.

Figure 2:
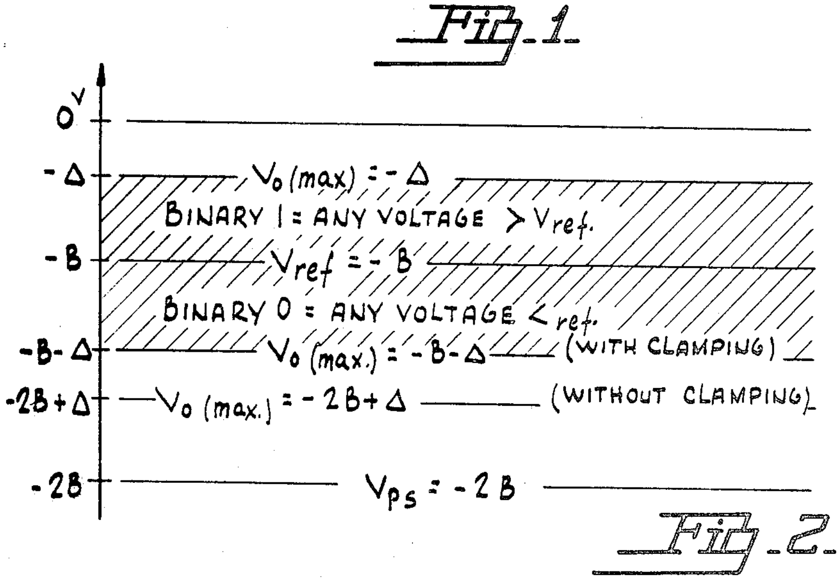
FIG. 2 is a graphic display showing the logic signal definition and various signal values for the illustrated NPN-bipolar transistor circuits.

According to a preferred example of the invention, only resistors of value R (as illustrated in FIG. 1) are utilized along with a reference voltage $V_{ref}$ which is equal to one-half the power supply voltage $V_{PS}$. Thus, as illustrated in FIG. 2, for $$V_{PS}=-2B \quad (1)$$
$$V_{ref}=-B \quad (2)$$

For the purpose of the following description, the base-emitter junction voltage drop ($V_{BE}$) of each transistor is assumed to be identical.

The number of input comparators possible, $n$, is determined by $V_{PS}$ and by how close to $-B$, the signal voltages are allowed to get. Let $$\Delta=V_{BE} \quad (3)$$

Then the amount of load current $I_L$ contributed by an input comparator with a 0-signal input, is $$I_L\frac{-B-\Delta-(-2B)}{R} \quad (4)$$

or $$I_L=\frac{B-\Delta}{R} \quad (5)$$

Since $n$ is an odd number, the closest decisions are made when $$\frac{(n-1)}{2}$$

input signals are 0's or $$\frac{(n-1)}{2}$$

signals are 1's, i.e., $$\frac{(n+1)}{2}$$

signals are 0's. These critical values develop a common-collector voltage $V_C$ of $$V_C=\frac{(n\pm1)}{2}\cdot\frac{(B-\Delta)}{R}\cdot\frac{(-2R)}{n} \quad (6)$$

or $$V_C=-B+\Delta\pm\frac{B-\Delta}{n} \quad (7)$$

Assuming the same $\Delta$ across the emitter-follower transistor 35 (the currents are only slightly different), the output $V_0$ is $$V_0=-B\pm\frac{(B-\Delta)}{n} \quad (8)$$

Equation 8 demonstrates that the FIG. 1 circuit is virtually independent of $V_{BE}$ variations in that the midpoint of the output signal always remains at $-B$. This is also the value of $V_{ref}$ for the input comparator of the driven stage. Thus, even though the margin $$\frac{B-\Delta}{n}$$

changes with $V_{BE}$ variations (increasing at higher temperatures), the driven stage input comparator merely detects whether $$-B\pm\frac{(B-\Delta)}{n}$$

is more positive or more negative than $-B$.

Figure 8:
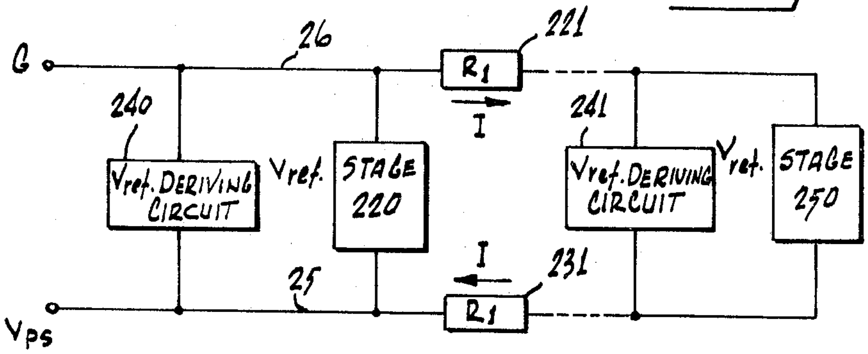
FIG. 8 is a block diagram and circuit diagram in part illustrating the power supply connections to a pair of the FIG. 1 logic stages which are relatively remotely located from one another.

Equation 8 further demonstrates that the FIG. 1 circuit is virtually independent of $V_{PS}$ (power supply) variations provided that the ground G variations are substantially equal and opposite. For example, in a large integrated circuit array, it is possible to make the IR drops of the $V_{PS}$ and G supply lines substantially equal. This is illustrated in FIG. 8 wherein the $V_{PS}$ and G supply lines 25 and 26 have a stage 220 and a stage 250 connected thereto at first and second locations, respectively. A first $V_{ref}$ deriving circuit 240 is connected between the supply lines 25 and 26 at the first location to provide the reference voltage $V_{ref}$ to the stage 220. A second $V_{ref}$ deriving circuit 241 is also connected between the supply lines 25 and 26 but at the second location to supply $V_{ref}$ to the stage 250.

There may be a substantial distance on the chip between the two locations of stages 220 and 250 so that the supply lines 25 and 26 have a finite resistance. By controlling the width and resistivity of the supply lines 25 and 26 during fabrication, these resistances can have equal values as illustrated by the lumped resistors 221 and 231 of value $R_1$. Thus with equal but opposite currents I flowing in lines 25 and 26, the $IR_1$ voltage drops are equal and opposite at any location along the length of the supply lines 25 and 26 irrespective of distance from the actual connections to the power supply source. It should be noted that for the case where $V_{ref}$ is derived as one-half of $V_{PS}$, the $V_{ref}$ value will be unchanged no matter where derived on the chip irrespective of distance from the actual connections of lines 25 and 26 to the power supply.

Assuming $\Delta=0.7$ volt (silicon material), several values of the signal margin $$\frac{B-\Delta}{n}$$

(Equation 8) are listed in the table. For B=1.6 ($|V_{PS}|$=3.2 volts).

TABLE

| n | 3 (mv.) | 5 (mv.) | 7 (mv.) | 9 (mv.) |
|---|---|---|---|---|
| B=2.0 | ±433 | ±260 | ±186 | ±144 |
| B=1.8 | ±367 | ±220 | ±157 | ±122 |
| B=1.6 | ±300 | ±180 | ±129 | ±100 |

Values of Signal Margin $$\frac{B-\Delta}{n}$$

the values of 7 and 9 for $n$ may appear to be too susceptible to noise. However, since $\Delta(V_{BE})$, $V_{PS}$, and temperature variations cancel out, only resistor ratio tolerances and input signal value variations need be considered in tolerance analysis. Moreover, as illustrated in FIG. 1, all of the resistances can be multiples of a fixed value resistor R so that the circuit design is dependent upon ratios of equal-valued resistors. This is important in integrated circuit fabrication since resistor values are controlled by the resistor geometry. As illustrated in FIG. 1, only one resistor geometry of value R can be used to implement all of the resistances so that resistance ratios should be reliably within 2%. Consequently, the main need for an extra signal margin is to allow for noise on the input lines. The signals which will be subject to substantial noise such as those gating a register, traveling a long distance on the integrated circuit chip, or leaving the chip altogether should be defined by gates with a small fan-in $n$ so that the output signal level margin will be relatively large. For example, when transmitting off the chip, a one input gate might be used.

The maximum signal swing conditions occur when no and when all 0 signals are applied. When no 0 signals are applied $V_C=0$ and $V_0$ becomes $-\Delta$. When all 0 signals are applied, all input comparators are contributing current so that $$V_C=n\frac{(B-\Delta)}{R}\cdot\frac{(-2R)}{n}$$

and $V_0$ becomes $-2B+\Delta$. These maximal signal conditions are symmetrical about $-B$, so that $$V_{0(max)}=-B\pm(B-\Delta) \quad (9)$$

One of the principal features of current mode switch comparators is that they can be operated in a nonsaturated manner thereby contributing to high speed operation. In the FIG. 1 example of the present invention, nonsaturating operation is achieved on the input line side of each comparator since the collector electrodes (e.g., collector electrode 22c of comparator $21_1$) are grounded and the signal voltage is always at least equal to or more negative than $-\Delta$ volt. However, the reference line side of the input comparators (for example transistor 23 of comparator $\mathbf{21}_1$) could be saturated by the lower extremes of the signal in the absence of clamping, depending upon the value of B. These reference transistors will have a collector-base forward bias of 0.4 volt unless $$-2B+2\Delta\geq -B-0.4 \qquad (10)$$

that is, for $\Delta=0.7$ volt, $$B\leq 1.4+0.4 \qquad (11)$$

or $$|V_{PS}|\leq 3.6 \text{ volts} \qquad (12)$$

It is possible to operate the circuit with $V_{PS}=-3.6$ volts to avoid the need for clamping, but fan-in is limited and elevated temperatures could result in saturation. For these reasons a clamping means is preferably provided, such as the clamping transistor 38 in the stage 20. The transistor 38 clamps the output comparator lines $\mathbf{27}_1$ through $\mathbf{27}_n$ by way of its base-emitter junction to a clamping voltage $V_{CL}$. To this end, transistor 38 has its emitter electrode 38*e* connected to the output lines $\mathbf{27}_1$ through $\mathbf{27}_n$ and its base electrode 38*b* connected to the clamping voltage $C_{CL}$. The collector electrode 38*c* is connected to the ground conductor 26. The clamping voltage $V_{CL}$ has any suitable value for preventing the reference transistors from saturating under worse-case conditions and may, by way of example, be given a value $$V_{CL}=-B+\Delta \qquad (13)$$

when there is a substantial number of 0 signal inputs (more than $$\frac{n+1}{2}$$

but generally less than $n$), the clamping transistor 38 is drawing substantial but moderate current. Its $V_{BE}$ voltage drop is $\Delta$ so that emitter electrode 38*e* and the comparator common collector voltage $V_C$ becomes clamped at $-$B volts, independently of $\Delta$. The output voltage then becomes clamped at $(-B-\Delta)$ volts.

Thus with clamping, the logic circuit stages 20 and 50 each in effect sum their respective input signals to provide an output signal level which may have any value above the $V_{ref}$ down to $(-B-\Delta)$ volts. The output signal above the $V_{ref}$ level up to $-\Delta$ volt or below $V_{ref}$ down to $(-B-\Delta)$ volts. The output signal level is then compared with the $-$B volts reference level by the input comparator of the driven stage for 1 and 0 signal detection. In the interest of signal symmetry about $V_{ref}$, it may also be desirable, but not necessary, to include additional clamping to limit the upper extremes of the output voltage.

For the case where a different input signal is applied to each of the input lines $\mathbf{31}_1$ through $\mathbf{39}_n$, the logic circuitry can be said to function as an $n$ input majority gate. The inputs can be weighted by applying the same input signal to two or more input lines. For example when $n=5$, if one signal is applied to two of the 5-input lines a (2111) gate results—weights respectively 2, 1, 1, and 1. Another way of weighting the inputs is to divide the $i^{th}$ comparator emitter resistor 24 by the weight $w_i$ as, for example, by connecting $w_i$ resistors of value R in parallel.

Figure 3:
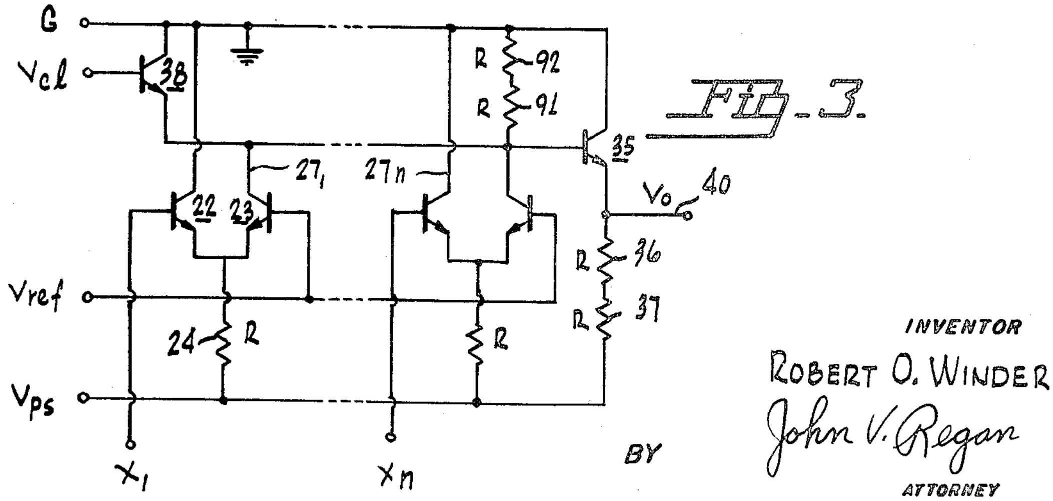
FIG. 3 is a circuit diagram of an AND logic circuit example in accordance with the invention.
Figure 4:
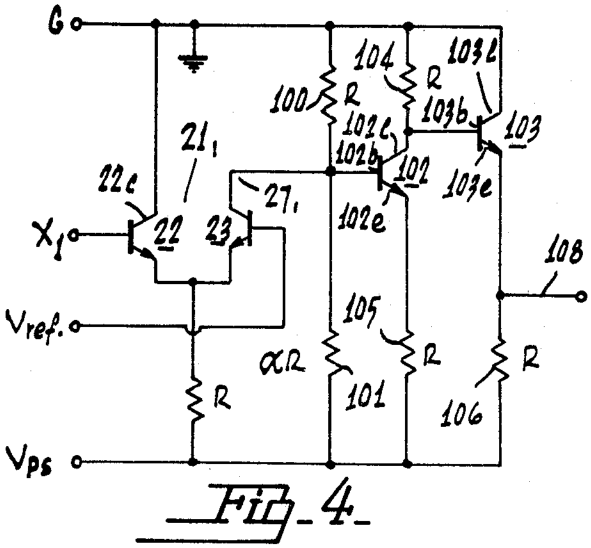
FIG. 4 is a circuit diagram of an inversion circuit example according to the invention.
Figure 5A:
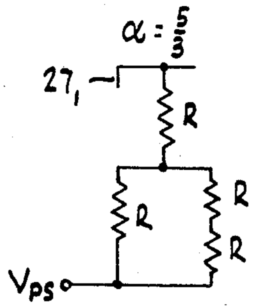
FIG. 5 is a diagram showing exemplary resistor connections for the parameter $\alpha$ of the FIG. 4 circuit.
Figure 5B:
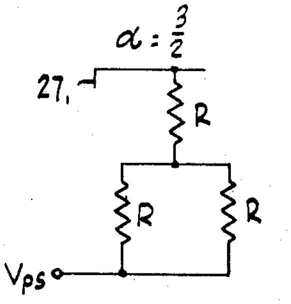

The threshold logic circuitry illustrated in FIG. 1 is merely one member of a group of compatible logic circuits which may be interconnected in various combinations to form desired digital systems. Some other exemplary members of the circuit group or family are illustrated in FIGS. 3, 4 and 5 as all being operable with the same $V_{PS}$, $V_{ref}$, $V_{CL}$ and signal levels as the FIG. 1 threshold logic embodiment. Each of these circuits bear physical resemblance to the FIG. 1 circuit so that like reference characters denote like components.

Referring now to FIG. 3, there is illustrated an $n$ input AND gate which differs from the stage 20 in FIG. 1 only in that a load impedance of generally higher value than the threshold load impedance is substituted therefor. As illustrated, the load impedance may have a value of 2R and be implemented by a pair of series-connected resistors 91 and 92, each of value R.

In operation, when all of the input signals $X_1$ through $X_n$ are 1's, no substantial current flows through the common load resistance. Thus, the output is $-\Delta$ volt which is more positive than $-$B volts ($V_{ref}$) and represents, therefore, a 1 signal. On the other hand, if any one or more of the input signals is a 0, current flows through the single load resistance to cause the output signal to fall below $-$B volts, representing a 0 signal. It should be noted that when exactly one of the input signals is a 0 signal, the voltage across the load resistance is $$-\frac{(B-\Delta)}{R}\cdot(2R)$$

or $-2(B-\Delta)$, which is sufficiently low to cause the clamping transistor 38 to clamp the common collector point to $-$B volts. (It is assumed for this illustration that $B>2.0$ volts; if not, a larger load resistor is required.) Thus, the output is a 1 only if all of the inputs are 1 and is a 0 if any one or more inputs is 0.

It should be noted at this point that each of the circuit examples thus far illustrated employs a single rail or output point common to each of the $n$ comparators so that a comparator input transistor (transistor 22 of comparator $\mathbf{21}_1$, for example) may have its collector electrode connected to ground, thereby preventing saturation. However, the invention is not limited thereto. It is within the contemplation of the present invention to provide a double rail circuit wherein the comparator input transistors may have their collector electrodes connected in common and to load resistance means rather than to circuit ground. Of course, suitable clamping would have to be provided to prevent saturation of the input transistors. For such configurations, the complement $\overline{V}_0$ of $V_0$ can be obtained from the common collector connection of the comparator input transistors by way of an additional emitter-follower transistor.

Referring now to FIG. 4, there is illustrated an exemplary inverter circuit which follows the grounded collector rule for the comparator input transistor. Thus in FIG. 4, the number $n$ of input comparators is equal to one and the input transistor 22 of the input comparator $\mathbf{21}_1$ has its collector electrode 22*c* connected to circuit ground. The output signal deriving means includes a pair of resistors 100 and 101 series-connected between the $V_{PS}$ and G supply lines with their common point connected to the output line $\mathbf{27}_1$ of the input comparator. The output signal deriving means further includes an inverting transistor 102 connected to drive an output emitter-follower transistor 103. To this end, the inverter transistor 102 has its base electrode 102*b* connected to the comparator output line $\mathbf{27}_1$. The collector electrode 102*c* is connected to the ground line by way of collector resistor 104; while the emitter electrode 102*e* is connected to the $V_{PS}$ line by way of emitter resistor 105. The collector electrode 102*c* is further connected to the base electrode 103*b* of the emitter-follower transistor 103. The collector electrode 103*c* is connected to the ground line; while the emitter electrode 103*e* is connected to the $V_{PS}$ line by way of resistor 106 and to an output lead 108.

All of the resistors have a value of R with the exception of resistor 101 which has a value of $\alpha$R. The parameter $\alpha$ is chosen, so that for a 0 input signal, the comparator reference transistor 23 does not saturate and for a 1 input signal, the inverter transistor 102 does not saturate. When $\alpha$ is suitably chosen, the resistance $\alpha$R can be composed of R-valued resistors as illustrated in FIG. 6*a* for $\alpha=5/3$ and in the FIG. 6*b* for $\alpha=3/2$. In each of these figures, the resistance 101 is comprised of a series resistor R in series with a parallel combination of R-valued resistors.

Figure 6:
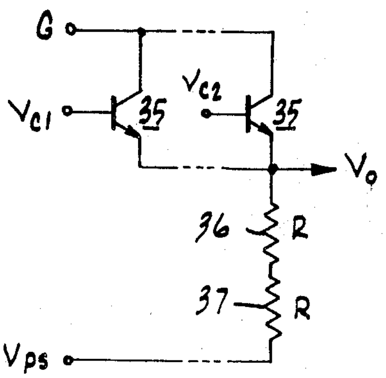
FIG. 6 is a partial circuit diagram showing the "phantom" OR capability of the present invention.

In FIG. 6, there is illustrated the "phantom" or wired-OR capability of the logic circuitry of the present invention. The output emitter-follower transistors 35 of two or more threshold logic stages or AND gate stages may be connected to share a common emitter resistance of value 2R. Thus, the output signal $V_0$ is simply the maximum of the separate outputs. It should be noted that if the emitter resistors of the output transistors were paralleled by a common connection, the emitter-follower output impedance would be decreased and the base current increased such that the common collector points could be appreciably affected.

Figure 7:
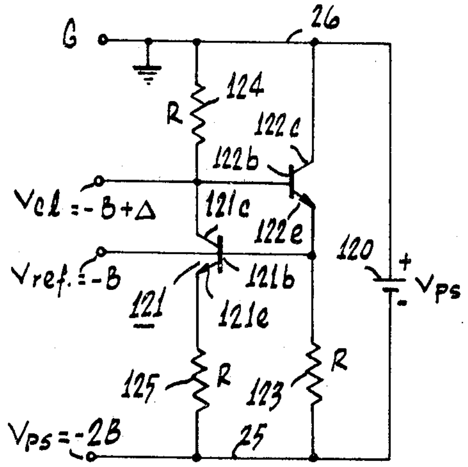
FIG. 7 is a circuit diagram of a reference supply which can be used for the circuit example of FIG. 1 as well as the circuit examples of FIGS. 3 and 4.

The various voltages $V_{Ps}$, $V_{ref}$ and $V_{CL}$ may be obtained from any suitable power supply circuit. By way of example, the supply circuit illustrated at FIG. 1 of the aforementioned copending application of Leopold Harwood may be employed. The power supply circuit there illustrated is reproduced in FIG. 7 with one difference, namely, a terminal for the clamping voltage $V_{CL}$.

In brief, the power supply circuit includes a suitable source of D.C. potential 120 which is illustrated as a battery having its positive terminal connected to the supply line 25 and its negative terminal connected to the supply line 26. The supply line 25 may be conveniently designated the ground reference for the illustrated NPN-transistor circuit embodiments and the supply line 26 as the $V_{Ps}$ line.

The power supply circuit includes a pair of transistors 121 and 122 each having their collector-emitter paths connected across the supply lines 25 and 26. To this end, transistor 122 has its collector electrode **122*c* connected to supply line 25 and its emitter electrode 122*e* connected by way of emitter resistor 123 to the supply line 26. The transistor 121 has its collector electrode 121*c* connected by way of collector resistor 124 to supply line 25 and its emitter electrode 121*e* connected by way of emitter resistor 125 to supply line 26. The transistor 122 has its base electrode 122*b* connected to the collector electrode 121*c* and to the $V_{CL}$ line; while its emitter electrode 122*e* is connected to the base electrode 121*b*** and to the $V_{ref}$ line.

Each of the resistors has a value R such that the emitter and collector currents of transistor 121 have equal values, whereby $V_{ref}$ has a value of —B or one-half the power supply voltage as specifically pointed out in the aforementioned copending application. The clamping voltage $V_{CL}$ is more positive than $V_{ref}$ by the base-emitter junction voltage ($\Delta$) of transistor 122 so that $V_{CL}=-B+\Delta$.

A power supply circuit as described above may be provided for each stage or may be utilized to drive more than one stage. That is, several of the supply circuits may be suitably located on a single chip to share a single power source 120 with each driving one or more stages.

The logic circuitry illustrated in FIG. 1 is especially suited for large integrated circuit arrays such as the multifunction chip. For example, a chip may contain an array of cells with each cell in turn containing two transistors and four resistors each of equal value R. A logic stage such as the stage 20 requires $n+1$ such cells (with $n$ resistors being left over); the reference supply requires one cell and the inverter two cells (borrowing one resistor from a neighboring cell for the case where $\alpha=\frac{5}{3}$). The unit cells can be laid out in a very small area with one wire layer to define the particular cell function and array interconnection, and a second wire layer for the power supply and interconnection of reference points.

What is claimed is:

1. A logic circuit comprising:

first and second power terminals adapted to receive an operating potential of given value;

means for generating a reference potential having a value equal to substantially one-half the value of said operating potential;

a number "N" of comparator circuits coupled between said power terminals, where "N" is an integer, each comparator circuit having a first input terminal adapted to receive an input signal, a second input terminal connected to said reference potential and an output line for generating a unit load current proportional to said reference potential when said input signal is smaller than said reference potential and substantially zero unit load current when said input signal is greater than said reference potential;

means coupling the output lines of each of said comparators in common;

load means;

means coupling said load means to said output lines for summing the unit load currents generated by said comparators and producing, in response thereto, an output voltage signal whose amplitude is a direct function of the number of comparators generating said unit load currents; and output follower means coupling said output voltage signal to an output terminal for producing an output logic signal having any one of several values relative to said reference potential with values more positive than said reference potential representing one binary significance and values more negative than said reference potential representing the other binary significance.

2. The combination as claimed in claim 1 wherein each of said comparators includes first and second transistors, each transistor having a base, an emitter and a collector;

wherein the base of said first transistor is connected to its associated input line and the base of said second transistor is connected to said reference potential, wherein the emitters of said transistors are connected in common and through a common emitter resistor of value R to one of said power terminals, and the collectors of said first and second transistors are coupled, the collectors of said second transistors through said load means to the other one of said power terminals; and wherein each of said transistors has a base-to-emitter junction voltage drop ($V_{BE}$) such that the unit load current generated by said comparators is approximately equal to the difference between said reference potential and the base-to-emitter junction voltage drop ($V_{BE}$) divided by the impedance of the common emitter resistance.

3. The combination as claimed in claim 2, wherein said load means has an equivalent impedance equal to $2R/N$.

4. The combination as claimed in claim 1 wherein "N" is an odd number and wherein the minimum deviation of the output signal with respect to said reference level occurs when $$\frac{N-1}{2}$$

of said comparators generate a unit load current and the remaining stages zero load current or when $$\frac{N+1}{2}$$

of said comparators generate a unit load current and the remaining stages zero load current, the amplitude of the output logic signal for the minimum deviation conditions being expressed as:

$$B-\frac{1}{N}[B-V_{BE}]$$

where B is substantially equal to said reference potential and $V_{BE}$ is a typical value of the base-to-emitter junction voltage drop of the transistors used.

5. A logic circuit in which the output signal is referenced at one-half the value of the source of operating potential to render the reference level immune to power supply variation comprising:

first and second power terminals adapted to receive an operating potential of given amplitude;

means for producing a reference potential having a value substantially equal to one-half said given amplitude;

a number "N" of comparators, where "N" is an integer, each comparator including a two-transistor current mode switch having: (1) a reference input terminal coupled to said source of reference potential, (2) a signal input line adapted to receive signal having a potential either greater than said reference potential or less than said reference potential, (3) a common emitter resistor of value R, (4) an output line for generating a unit load current proportional to the reference voltage divided by the value of the emitter resistor when the reference signal is greater than said input signal and substantially zero when the input signal is greater than said reference potential;

means connecting said output lines together;

an emitter follower having its base coupled to said output lines, and its emitter connected to an output terminal for producing output logic signals;

load means coupled between each of said output lines and one of said power terminals, the equivalent impedance of said load being approximately twice the value of said emitter resistance divided by "N" for producing a signal at said output terminal which is referenced to a voltage level approximately equal to one-half the amplitude of said source of operating potential.

6. The invention according to claim 5, wherein a further comparator is provided for comparing the output logic signal voltage with said reference potential to detect the binary significance thereof.

References Cited

UNITED STATES PATENTS

| | | | |
|---|---|---|---|
| 2,980,806 | 4/1961 | Ort | 307—237 X |
| 3,378,695 | 4/1968 | Marette | 307—213 X |
| 3,404,285 | 10/1968 | Hazlett | 307—215 X |

OTHER REFERENCES

Schmookler: I.B.M. Technical Disclosure Bulletin, vol. 8, No. 1, June 1965, pp. 187, 188.

JOHN S. HEYMAN, Primary Examiner

U.S. Cl. X.R.

307—213, 214, 215, 296; 330—30